April 13, 1926.

T. KING

HEADLIGHT

Original Filed March 19, 1924

1,581,066

Inventor
Thomas King

By
Attorney

Patented Apr. 13, 1926.

1,581,066

UNITED STATES PATENT OFFICE.

THOMAS KING, OF SANDPOINT, IDAHO.

HEADLIGHT.

Application filed March 19, 1924, Serial No. 700,329. Renewed February 23, 1926.

*To all whom it may concern:*

Be it known that I, THOMAS KING, a citizen of the United States, residing at Sandpoint, in the county of Bonner and State of Idaho, have invented new and useful Improvements in Headlights, of which the following is a specification.

This invention relates to headlights for automobiles and particularly to that type combining with the usual longitudinal light ray projecting means a supplemental light ray projecting attachment at an angle to the main headlight organization.

The primary object of the invention is to provide means in connection with an ordinary headlight for reflecting and projecting light rays downwardly at an angle on the roadway in advance of the steering wheels of an automobile, to direct the operator or driver in steering the machine, and have the said means operable independently of the main part of the headlight organization, so as to do away with the necessity of dimming headlights and at the same time provide for a roadway illumination, and whereby safe passing of cars results in view of the fact that the usual glaring, longitudinally-projected light rays that act to blind the driver of an approaching car may be cut off by entirely extinguishing the illuminating means of the main headlight.

With this and other objects and advantages in view, the invention consists in the construction and arrangement of the several parts which will be more fully hereinafter described and claimed.

Figure 1:
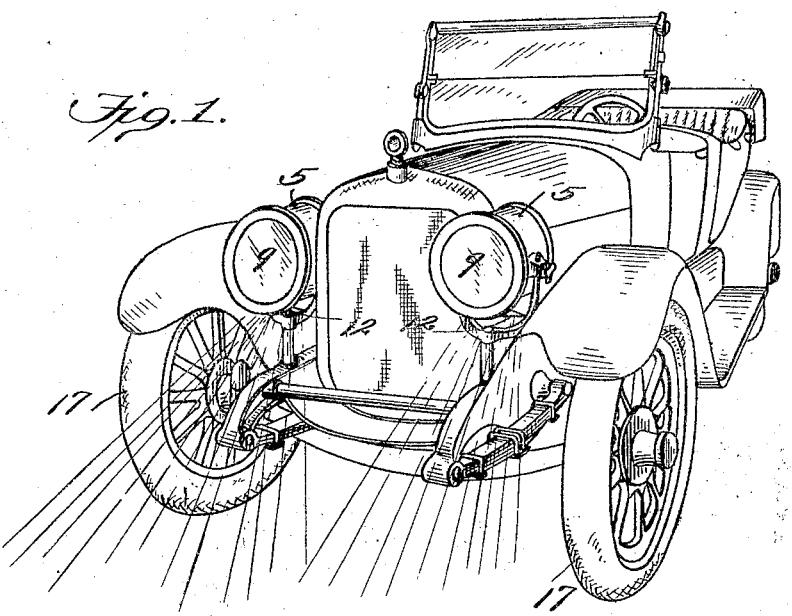
Fig. 1 is a perspective view of an automobile showing the improved headlight structure applied thereto and illustrating the angle of the light rays projected from the lower portion of the headlight when the main headlight organization is extinguished.

The improved headlight comprises the usual form of enclosing casing 5 with a parabolic reflector 6 therein having an incandescent electric lamp 7 disposed centrally with relation to said reflector and provided with an electrical conductor 8 leading back to a suitable switch. In the front of the casing 5 is the usual lens or glass 9. The headlight as thus far described is of the usual form and operates through the medium of the incandescent light 7 when the latter is ignited to project light rays longitudinally in advance of the automobile or other vehicle on which the improved light may be mounted.

Figure 3:
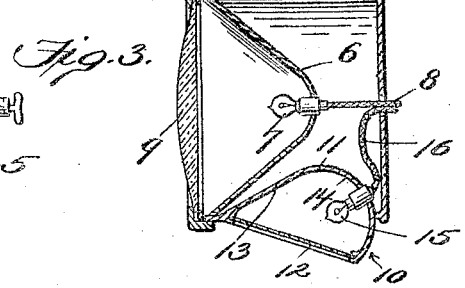
Fig. 3 is a section on the line 3—3, Fig. 2.

The improvement consists in a lower supplemental light generally designated by 10, which is mounted in the bottom portion of the casing 5 as clearly shown by Fig. 3, and comprises a separate casing 11 having the interior arranged as a reflecting surface and disposed at an angle so that the glass or lens 12 is at the bottom of the said separate casing and inclines rearwardly and upwardly towards the front of the main headlight at a suitable angle, to throw the light rays downwardly and in advance of the front of the automobile or other vehicle to which the light may be applied, as indicated by Fig. 1. The separate casing 11 is suitably set in the lower portion of the main headlight casing 5 and has a forwardly and downwardly inclined reflecting member 13 merging into a rear arcuate reflecting member 14, and at a suitable angle within the arcuate member or near the rear terminal of said member an incandescent electric lamp 15 is fixed and has a suitable electric conductor 16 secured thereto and extending any distance from the rear side of the casing 5 with the conductor 8 to a switch, which may be of any approved type for independently operating the two lighting constituents of the improved headlight. The position of the incandescent electric light 15 may be varied but it will be arranged at all times in the arcuate member 14 to produce a forward and downward angle of projection of the light rays, to illuminate the roadway in advance of the steering wheels 17 of the automobile. The improved headlight is very simple in its structure and the improvement consisting of the supplemental light is always held in fixed relation to the main headlight and at the bottom portion of the casing 5 of the latter.

Figure 2:
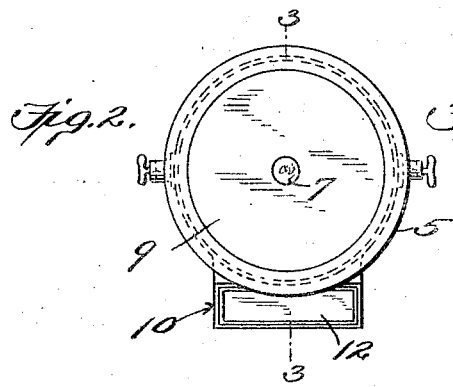
Fig. 2 is a front elevation of the improved headlight.
Figure 4:
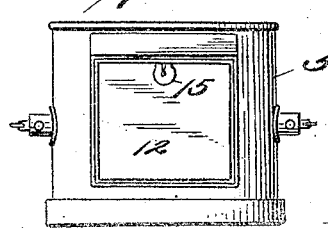
Fig. 4 is a bottom plan view of the improved headlight.

From the foregoing it will be seen that the incandescent electric lights 7 and 15 are independently operable, or may be controlled by suitable switch means to glow independently, and when the main headlight lamp 7 is active, the supplemental or auxiliary lamp 15 will be extinguished, and vice versa, and by this means provision is made for entirely eliminating from a headlight all blinding glare which as is well known is confusing to pedestrians and others in approaching vehicles, and at the same time the supplemental or auxiliary light will serve to effectively assist the driver or operator of an automobile or other vehicle in steering operations. As shown by Figs. 2 and 4, the improved lighting attachment or supplemental light 10 is of such dimensions as to permit projection of the rays of light not only straight downwardly at a forward angle of inclination but laterally to a certain extent, so that the steering wheels may be readily seen by the driver or operator of an approaching machine and serve as an advantageous means in one machine passing another without liability of contact of the passing machines.

A material advantage of the improved light attachment is that it may be constructed and installed at a comparatively small expense, it being proposed to use the ordinary or standardized forms of headlights in connection with the improvement and, where permissible, to apply the supplemental or auxiliary lighting means to standardized headlight structures.

It is also proposed to make such changes in the details of construction without departing from the essential features of the invention as will render the supplemental road-illuminating attachment applicable to headlights of various forms.

What is claimed as new is:

The combination with a main headlight comprising a casing with reflecting means, a front upright lens to project rays of light longitudinally forward from the said headlight and a light-producing means in the center of the reflecting means, of a supplemental headlight casing mounted in and extending partially upward into the lower central portion of the casing and having a rear true arcuate portion disposed at a downward angle relatively to the main casing and a forwardly projecting, straight, downwardly inclined wall continuing from the forward portion of the true arcuate portion of the casing, the supplemental casing being normally fully open at the bottom and having a lens secured therein, and lighting means eccentrically disposed in the rear arcuate portion of the supplemental casing and also arranged at a downward and forward angle of inclination, the supplemental casing and its parts as specified being located wholly in rear of the front lens and portion of the main casing, the light producing means of the main headlight and the supplemental headlight having independent electrical connections to adapt the same to be independently operated.

In testimony whereof I have hereunto set my hand.

THOMAS KING.